(12) United States Patent
Ichinohe

(10) Patent No.: US 7,354,983 B2
(45) Date of Patent: Apr. 8, 2008

(54) SILICONE WAX

(75) Inventor: Shoji Ichinohe, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 176 days.

(21) Appl. No.: 10/556,578

(22) PCT Filed: May 12, 2003

(86) PCT No.: PCT/JP03/05905

§ 371 (c)(1),
(2), (4) Date: Nov. 14, 2005

(87) PCT Pub. No.: WO2004/099290

PCT Pub. Date: Nov. 18, 2004

(65) Prior Publication Data

US 2007/0004891 A1  Jan. 4, 2007

(51) Int. Cl.
C08G 77/08 (2006.01)
(52) U.S. Cl. ............................ 528/31; 528/26; 528/29; 528/15
(58) Field of Classification Search ................ 556/437; 528/26, 15, 31, 29
See application file for complete search history.

(56) References Cited

U.S. PATENT DOCUMENTS

| 3,371,104 | A | * | 2/1968 | Gerd et al. | ............... | 554/77 |
| 4,384,100 | A | * | 5/1983 | Takamizawa et al. | ......... | 528/41 |
| 4,421,565 | A | * | 12/1983 | DiBella | ................ | 106/169.39 |
| 4,725,658 | A | | 2/1988 | Thayer et al. | | |
| 5,095,085 | A | * | 3/1992 | Hara et al. | ............... | 528/15 |
| 5,417,967 | A | * | 5/1995 | Kawamata et al. | ....... | 424/78.03 |
| 6,713,221 | B2 | * | 3/2004 | Kada et al. | ............... | 430/108.4 |
| 2002/0172879 | A1 | | 11/2002 | Kada et al. | | |
| 2003/0096919 | A1 | | 5/2003 | Ichinohe | | |

FOREIGN PATENT DOCUMENTS

| GB | 2299024 A | 9/1996 |
| JP | 56-123551 A | 9/1981 |
| JP | 6-322356 A | 11/1994 |
| JP | 7-224170 A | 8/1995 |
| JP | 7-244398 A | 9/1995 |
| JP | 63-189438 A | 8/1998 |
| JP | 2002-69190 A | 3/2002 |
| JP | 2002-212142 A | 7/2002 |
| JP | 2002-338689 A | 11/2002 |
| JP | 2003-147081 A | 5/2003 |
| WO | WO-02/077071 A1 | 10/2002 |

* cited by examiner

Primary Examiner—Margaret G. Moore
(74) Attorney, Agent, or Firm—Birch, Stewart, Kolasch & Birch, LLP

(57) ABSTRACT

A silicone wax represented by the following formula (1),

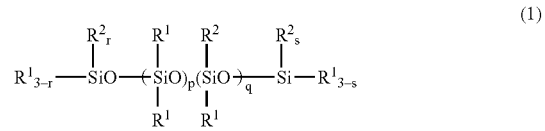

wherein $R^1$ is a group selected from the group consisting of alkyl groups having 1 to 20 carbon atoms, alicyclic groups, aryl groups, aralkyl groups and fluorinated alkyl groups;
$R^2$ is a group having a pentaerythritol polybehenate residue represented by the following formula (2), $$(CH_2OCOC_{21}H_{43})_mC(CH_2O-X-)_{4-m} \quad (2)$$

wherein $1 \leq m < 4$
or a group having a dipentaerythritol polybehenate residue represented by the following formula (3), $$O(CH_2C)_2(CH_2OCOC_{21}H_{43})_n(CH_2-X-)_{6-n} \quad (3)$$

wherein $1 \leq n < 6$, —X— in the formulae (2) and (3) being any one of the following moieties,
—$R^3$—,
—$COR^4$—,
wherein $R^3$ is a $C_3$-$C_8$ alkylene group or a cycloalkylene group, $R^4$ is a $C_4$-$C_{20}$ aliphatic or alicyclic group having at least one group selected from the group consisting of carboxyl, carbonyloxy and hydroxyl groups, p, q, r and s each is a number with $0 \leq p \leq 200$, $0 \leq q \leq 200$, $0 \leq r \leq 3$, and $0 \leq s \leq 3$, provided that $0 \leq p+q \leq 200$ and $1 \leq q+r+s$.

10 Claims, No Drawings

SILICONE WAX

FIELD OF THE INVENTION

The present invention relates to a silicone wax, particularly to a silicone wax which has a pentaerythritol polybehenate residue and is suitable as a releasing agent to be internally added to a toner.

DESCRIPTION OF THE PRIOR ART

As a releasing agent internally added to a toner used in PPC copiers or printers, a silicone wax having a long hydrocarbon chain has been used. For example, in Japanese Patent Application Laid-Open No. H7-244398, an organopolysiloxane compound which has a long hydrocarbon group having 18 or more carbon atoms is described. In Japanese Patent Application Laid-Open No. 2002-338689, a waxy organopolysiloxane having a pendent long alkyl chain or a pendent long alkyl chain having a hetero atom is described.

A releasing agent to be internally added to a toner is required to have a melting point of a predetermined temperature or higher, preferably 60° C. or higher. A toner having a lower melting point tends to agglomerate during storage to fail to give a clear image.

Generally, an organopolysiloxane has a broad melting point peak of from low temperatures to high temperatures due to its broad molecular weight distribution. An organopolysiloxane having a sharp melting peak is desirable.

The organopolysiloxane disclosed in the aforesaid Japanese Patent Application Laid-Open No. 2002-338689 has an endothermic peak temperature ranging from 40° C. to 150° C., particularly from 60° C. to 100° C. This peak is too broad. Even a wax having a melting peak of 60° C. to 100° C. with an apex temperature of 87° C., for example, contains so much as about 1% of a fraction having a melting of 35° C. or lower.

The present inventor found a wax having a narrow peak of melting points prepared by hydrosilylation of an unsaturated ester of a higher fatty acid or an unsaturated ether of a higher alcohol with a silicone compound having an SiH bond (Japanese Patent Application No.2001-351576). However, the wax has a melting peak apex at a temperature below 60° C. except a silicone-amide prepared by reacting behenic acid with a silicone modified at both ends with amine. The silicone-amide has a melting point of 74° C., but its compatibility with a toner resin is not good.

An object of the present invention is to provide a silicone wax which has a melting peak apex at a temperature of 60° C. or higher, a narrow melting point peak, and good compatibility with a toner resin.

SUMMARY OF THE INVENTION

The present invention is a silicone wax represented by the following formula (1).

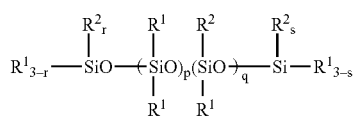

(1)

The above silicone wax is characterized by $R^2$ which has a pentaerythritol polybehenate residue.

Preferably, $R^4$ is any one of the following moieties,
—$CH(CH_2COOH)$—$R^5$—,
—$R^6COOCH_2CH(OH)$ $R^7$—.

Preferably, the silicone wax shows an endothermic peak measured with a differential scanning calorimeter in a heating rate of 10° C./min, which peak has an apex at a temperature ranging from 60° C. to 100° C. and a half width of 10° C. or smaller.

Preferably, the silicone wax has a weight average molecular weight, reduced to polystyrene, of from 2,000 to 8,000.

Other aspects of the present invention include the following methods of preparing a silicone wax.

A method of preparing a silicone wax comprising the steps of
(1) preparing a (di)pentaerythritol polybehenate by reacting (di)pentaerythritol with behenic acid, and
(2) reacting the (di)pentaerythritol polybehenate with an organopolysiloxane modified with an acid anhydride.

A method of preparing a silicone wax comprising the steps of
(1) preparing a (di)pentaerythritol polybehenate allyl ether by reacting (di)pentaerythritol, allyl chloride and behenic acid, and
(2) reacting the (di)pentaerythritol polybehenate allyl ether with an organohydrogenpolysiloxane in the presence of a catalyst.

A method of preparing a silicone wax comprising the steps of
(1) preparing a (di)pentaerythritol polybehenate by reacting (di)pentaerythritol with behenic acid,
(2) preparing a (di)pentaerythritol polybehenate having a carboxyl group by reacting the (di)pentaerythritol polybehenate with an acid anhydride,
(3) preparing an alkenylated (di)pentaerythritol polybehenate by reacting the (di)pentaerythritol polybehenate having a carboxyl group with an epoxy compound having a double bond, and
(4) reacting the alkenylated (di)pentaerythritol polybehenate with an organohydrogenpolysiloxane in the presence of a catalyst.

In these methods, the behenic acid preferably has a purity of 90% or higher. In the method wherein a pentaerythritol polybehenate is prepared as an intermediate, the pentaerythritol polybehenate preferably has an OH value of from 45 to 65. In the method wherein a dipentaerythritol polybehenate is prepared as an intermediate, the dipentaerythritol polybehenate preferably has an OH value of from 20 to 40.

DESCRIPTION OF THE PREFERRED EMBODIMENTS

The present silicone wax is represented by the following formula (1).

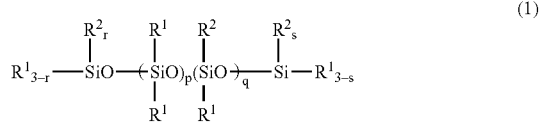

(1)

In the formula (1), $R^1$ is a group selected from the group consisting of alkyl groups having 1 to 20 carbon atoms, alicyclic groups, aryl groups, aralkyl groups and fluorinated alkyl groups;

$R^2$ is a group having a pentaerythritol polybehenate residue represented by the following formula (2), $$(CH_2OCOC_{21}H_{43})_mC(CH_2O-X-)_{4-m} \quad (2)$$

wherein $1 \leq m < 4$ or a group having a dipentaerythritol polybehenate residue represented by the following formula (3), $$O(CH_2C)_2(CH_2OCOC_{21}H_{43})_n(CH_2O-X-)_{6-n} \quad (3)$$

wherein $1 \leq n < 6$,

—X— in the formulae (2) and (3) being any one of the following moieties,
—$R^3$—,
—$COR^4$—, wherein $R^3$ is a $C_3$-$C_8$ alkylene group or a cycloalkylene group, $R^4$ is a $C_4$-$C_{20}$ aliphatic or alicyclic group having at least one group selected from the group consisting of carboxyl, carbonyloxy and hydroxyl groups, p, q, r and s each is a number with $0 \leq p \leq 200$, $0 \leq q \leq 200$, $0 \leq r \leq 3$, and $0 \leq s \leq 3$, provided that $0 \leq p+q \leq 200$ and $1 \leq q+r+s$.

Examples for $R^1$ include alkyl groups such as methyl, ethyl, propyl, butyl, pentyl, hexyl, heptyl, octyl, nonyl and decyl groups; alicyclic groups such as cyclopentyl and cyclohexyl groups; aryl groups such as phenyl and tolyl groups; aralkyl groups such as benzyl and phenetyl groups; fluorinated alkyl groups such as trifluoropropyl and heptadecafluorodecyl groups, among which methyl, phenyl and trifluoropropyl groups are preferred.

In the formulae (2) and (3), the (di)pentaerythritol polybehenate residue is derived from a (di)pentaerythritol polybehenate (hereinafter referred to as polybehenate). The polybehenate is preferably prepared from behenic acid having a purity of 90% or higher, more preferably 95% or higher. The hither the purity, the narrower the melting peak, which is desired.

The polybehenate can be prepared by esterification between behenic acid and pentaerythritol or dipentaerythritol. The esterification can be performed by any known method. For example, pentaerythritol reacts with behenic acid as follows:

$$C(CH_2OH)_4 + mC_{21}H_{43}COOH \rightarrow (CH_2OH)_{4-m}C(CH_2OCOC_{21}H_{43})_m \quad (4)$$

wherein m is an integer of from 1 to 4.

Dipentaerythritol reacts with behenic acid as follows:

$$O(CH_2C)_2(CH_2OH)_6 + nC_{21}H_{43}COOH \rightarrow O(CH_2C)_2(CH_2OH)_{6-n}(CH_2OCOC_{21}H_{43})_n \quad (5)$$

wherein n is an integer of from 1 to 6.

In the (di)pentaerythritol polybehenate residue, m is a number of from 1 to 3, preferably 2 or 3, and n is a number of from 1 to 5, preferably from 3 to 5. Thus, the term, "poly", as used herein, includes "mono." Polybehenate with m=4 or n=6 having no hydroxyl group in the molecule is not preferred because such a polybehenate cannot bond to an organopolysiloxane and remains unreacted. This requires an undesirable purification process to remove the remaining polybehenate by, for example, fractionation according to molecular weights. A polybehenate having two or more of hydroxyl groups is reacted preferably with an organopolysiloxane having one reactive group to prevent gellation. As mentioned above, m and n each can be two or more different numbers. Practically, an average of m or n is determined and reaction conditions are set depending on the average.

A pentaerythritol polybehenate having the aforesaid preferred range of m can be obtained by reacting 1 mole of pentaerythritol with about 3 or fewer moles of behenic acid.

A mixture of pentaerythritol tetrabehenate, pentaerythritol tribehenate and pentaerythritol dibehenate can be obtained.

A dipentaerythritol polybehenate having the aforesaid preferred range of n can be obtained by reacting 1 mole of dipentaerythritol with about 5 or fewer moles of behenic acid. A mixture of dipentaerythritol hexabehenate, dipentaerythritol pentabehenate, dipentaerythritol tetrabehenate and dipentaerythritol tribehenate can be obtained.

In the present silicone wax, the aforesaid (di)pentaerythritol polybehenate residue is bonded to an Si atom of an organopolysiloxane via any one of the following moieties,
—$R^3$—,
—$COR^4$—, wherein $R^3$ is a $C_3$-$C_8$, preferably $C_3$-$C_6$ alkylene group or alicyclic group. $R^4$ is a $C_4$-$C_{20}$, preferably $C_6$-$C_8$ aliphatic or alicyclic hydrocarbon group having at least one selected from the group consisting of carboxyl, carbonyloxy and hydroxyl groups. The preferred $R^4$ include the following moieties,
—$CH(CH_2COOH)$—$R^5$—,
—$R^6COOCH_2CH(OH)R^7$—, wherein $R^5$ is a $C_3$-$C_8$ alkylene or a cycloalkylene group, $R^6$ is a $C_3$-$C_8$ alkylene group, and $R^7$ is a $C_3$-$C_9$ alkylene or cycloalkylene group which may have a substituent having an oxygen atom.

The present silicone wax with X being —$R_3$— can be prepared by the following two methods.

The first method comprises the steps of reacting (di)pentaerythritol polybehenate with an organic chloride having a double bond at an end to prepare (di)pentaerythritol polybehenate allyl ether, and then reacting the double bond of the ether with an organohydrogenpolysiloxane in the presence of a platinum catalyst.

For example, pentaerythritol polybehenate reacts with allyl chloride as follows.

$$(CH_2OH)_{4-m}C(CH_2OCOC_{21}H_{43})_m + (CH_2=CHCH_2Cl)_{4-m} \rightarrow (CH_2=CHCH_2OCH_2)_{4-m}C(CH_2OCOC_{21}H_{43})_m$$

The second method comprises the steps of synthesizing a (di)pentaerythritol polyallyl ether having a double bond at an end as follows, $$C(CH_2OH)_4 + (CH_2=CHCH_2Cl)_{4-m} \rightarrow (CH_2=CHCH_2OCH_2)_{4-m}C(CH_2OH)_m,$$

preparing a (di)pentaerythritol behenate polyallyl ether by reacting the remaining hydroxyl group in the above polyallyl ether with behenic acid, and reacting the ether with an organohydrogenpolysiloxane in the presence of a platinum catalyst.

The organohydrogenpolysiloxane may have an —SiH functional group either at an end or at any other location in the molecule, and is preferably represented by the following general formula (6),

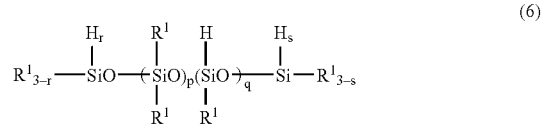

wherein $R^1$, p, q, r, and s are as defined above concerning the formula (1).

The reaction of the organohydrogenpolysiloxane with (di)pentaerythritol polybehenate having a double bond at an end may be performed in any known manner in the presence of a platinum catalyst in a solvent or without a solvent. A reaction temperature may range from 30 to 150° C., preferably from 60° C. to 120° C.

A molar ratio of the terminal double bond to the —SiH group in the organohydrogenpolysiloxane, double bond/SiH, is not limited, but preferably in the range of from 1.05 to 1.2.

The silicone wax with X being —CO R$_4$— can be prepared by the following two methods.

The first method is to react (di)pentaerythritol polybehenate with an organopolysiloxane modified with an acid anhydride. The acid anhydride-modified organopolysiloxane can be prepared by a known method, for example, by addition-reacting an acid anhydride having an unsaturated group such as allyl succinic anhydride and 5-norbornene-2,3-dicarboxylic anhydride with an organohydrogenpolysiloxane, preferably the one represented by the above formula (6), in the presence of a platinum catalyst.

The following structure, for instance, is obtained from pentaerythritol polybehenate and allyl succinic anhydride (CH$_2$OCOC$_{21}$H$_{43}$)$_m$C(CH$_2$OCOCH(CH$_2$COOH)
    CH$_2$CH$_2$CH$_2$)$_{4-m}$—Si— wherein —Si— represents a polysiloxane moiety.

A molar ratio of the acid anhydride bond of the acid anhydride-modified organopolysiloxane to the hydroxyl group of (di)pentaerythritol polybehenate, acid anhydride bond moiety/hydroxyl group, is preferably in the range of from 0.8 to 1.2.

The second method to prepare the silicone wax with X being —CO R$_4$— comprises the steps of reacting a remaining hydroxyl group of (di)pentaerythritol polybehenate with at least an equimolar amount of a cyclic acid anhydride to introduce a carboxyl group into the behenate molecule, reacting the carboxyl group with an excess molar amount of an epoxy compound having a double bond, and isolating the obtained alkenylated (di)pentaerythritol polybehenate which then is reacted with an organohydrogenpolysiloxane preferably represented by the above-mentioned formula (6) in the presence of a platinum catalyst.

Any cyclic acid anhydride may be used, but preferably succinic anhydride is used. As the epoxy compound having a double bond, allyl glycidyl ether, and vinyl cyclohexene oxide are preferably used. The organohydrogenpolysiloxane may have an —SiH functional group either at an end or at any other location in the molecule, and is preferably represented by the above-mentioned formula (6). The reaction between the organohydrogenpolysiloxane and (di)pentaerythritol polybehenate having a terminal double bond is described above.

The following structure is obtained from, for instance, pentaerythritol polybehenate, succinic anhydride, allyl glycidyl ether and organohydrogenpolysiloxane (CH$_2$OCOC$_{21}$H$_{43}$)$_m$C(CH$_2$OCOC$_2$H$_4$COOCH$_2$CH
    (OH) CH$_2$OC$_3$H$_7$)$_{4-m}$—Si— wherein —Si— represents a polysiloxane moiety.

The silicone wax thus obtained has an endothermic peak as measured with a differential scanning calorimeter, DSC, in a heating rate of 10° C./min, which peak has an apex at a temperature ranging from 60° C. to 100° C., preferably from 70° C. to 90° C., and a half width of 10° C. or smaller, preferable 7° C. or smaller.

Preferably, the silicone wax has a weight average molecular weight, reduced to polystyrene, measured by GPC, of from 1,000 to 8,000, more preferably from 2,000 to 7,000, most preferably from 3,000 to 6,000.

EXAMPLES

The present invention will be explained with reference to the Examples, but not limited thereto.

Example 1

Pentaerythritol polybehenate (I) was prepared by esterification of pentaerythritol with behenic acid,

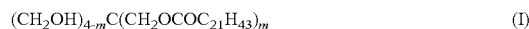

wherein m was a mixture of 2, 3 and 4.

Pentaerythritol polybehenate (I) had an OH value of 54.2 and was a mixture of pentaerythritol tetrabehenate, pentaerythritol tribehenate, and pentaerythritol dibehenate, whereas pure pentaerythritol tribehenate has an OH value of 50.9.

In a flask, 103.5 g, corresponding to 0.1 mole of the hydroxyl group, of pentaerythritol polybehenate (I), 168.7 g corresponding to 0.1 mole of the anhydride group of the following acid anhydride-modified organopolysiloxane,

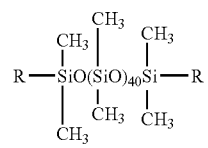

wherein R is represented by the following formula,

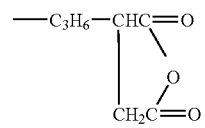

300 g of toluene and 0.3 g of potassium acetate were placed and subjected to a reaction under reflux for 4 hours. Silicone-modified ester wax (A) was obtained after toluene was removed by heat stripping at a reduced pressure. The wax (A) had a melting point of 75° C. The wax had clear appearance at temperatures above the melting point. This indicated that the wax had a uniform composition with less unreacted substances.

Example 2

Dipentaerythritol polybehenate (II) was prepared by esterification of dipentaerythritol with behenic acid,

wherein n was a mixture of 3, 4, 5 and 6.

Dipentaerythritol polybehenate (II) had an OH value of 31.2 and was a mixture of dipentaerythritol hexabehenate, dipentaerythritol pentabehenate, dipentaerythritol tetrabehenate and dipentaerythritol tribehenate, whereas pure dipentaerythritol behenate has a OH value of 30.1.

Silicone-modified ester wax (B) was obtained in the same manner as in Example 1 except that 186.4 g, corresponding to 0.1 mole of the hydroxyl group, of dipentaerythritol polybehenate (II) was used in place of pentaerythritol polybehenate (I). Wax (B) had a melting point of 78° C. and clear appearance at temperatures above the melting point.

Example 3

In a flask, 107.5 g, corresponding to 0.1 mole of the double bond, of the following allylated product (III) of pentaerythritol polybehenate (I), $$(CH_2=CHCH_2OCH_2)_{4-m}C(CH_2OCOC_{21}H_{43})_m \quad (III)$$

wherein m was a mixture of 2, 3 and 4, 143.5 g, corresponding to 0.09 mole of the SiH, of the methylhydrogenpolysiloxane having the following structure,

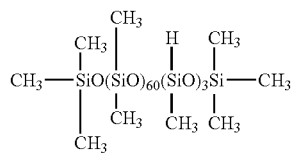

300 g of toluene, and 0.5 g of a 0.5% solution of chloroplatinic acid in toluene were placed and subjected to a reaction under reflux for 4 hours. Silicone-modified ester wax (C) was obtained after toluene was removed by heat stripping at a reduced pressure. Wax (C) had a melting point of 73° C. and clear appearance at temperatures above the melting point.

Example 4

In a flask, 103.5 g, corresponding to 0.1 mole of the hydroxyl group, 10.0 g (0.1 mole) of succinic anhydride, 300 g of toluene, and 0.3 g of potassium acetate were placed and subjected to a reaction under reflux for 3 hours. Then, 18.6 g (0.15 mole) of 4-vinyl-1-cyclohexeneoxide was added and subjected to a reaction for another 3 hours. A vinyl-functional ester wax was obtained after toluene and excess reactants were removed by heat stripping at a reduced pressure. To the wax, 300 g of toluene, 0.5 g of a 0.5% solution of chloroplatinic acid in toluene, and 139.2 g, corresponding to 0.09 mole of the SiH, of methylhydrogenpolysiloxane represented by the following formula were added and subjected to a reaction under reflux of toluene for 4 hours.

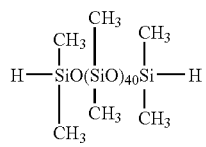

Silicone-modified ester wax (D) was obtained after toluene was removed by heat stripping at a reduced pressure. The wax (D) had a melting point of 73° C. and clear appearance at temperatures above the melting point.

Comparative Example 1

In a flask, 1707 g (2.2 moles) of glycerin monoallyl ether dibehenate, $C_{21}H_{43}OCOCH_2CH(OCOC_{21}H_{43})CH_2OCH_2CH=CH_2$, prepared by reacting behenic acid with glycerin monoallyl ether, the same weight of toluene, and 5 g of 0.5% solution of neutralized chloroplatinic acid complex with tetramethyldivinyldisiloxane in toluene were placed, to which 726 g (1.0 mole) of methylhydrogenpolysiloxane having the following average structure was added dropwise at 80° C.

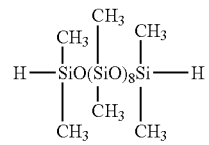

Then, the mixture thus obtained was subjected to a reaction under reflux of toluene for 5 hours and 2310 g, corresponding to a yield of 95%, of Silicone wax (E) was obtained by stripping the solvent.

Comparative Example 2

Silicone wax (F) in an amount of 1780 g, corresponding to a yield of 96%, was prepared in the same manner as in Comparative Example 1 except that 1132 g (2.3 moles) of behenyl undecylenate, $C_{22}H_{45}OCO(CH_2)_8CH=CH_2$, prepared by reacting undecylenic acid with behenyl alcohol, was used in place of 1707 g (2.2 moles) of glycerin monoallyl ether dibehenate.

Comparative Example 3

Behenic acid in an amount of 680 g (2.0 moles) and 841 g (1.0 mole), of the organopolysiloxane amino-modified at both terminals represented by the following formula were subjected to a dehydration/condensation reaction in 680 g of xylene for 5 hours. 440 g, corresponding to a yield of 97%, of Silicone wax (G) was obtained by stripping the solvent.

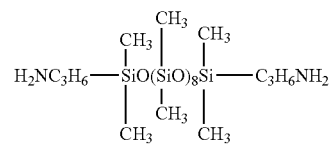

Comparative Example 4

In 800 g of xylene, 1641 g (2.2 moles) of dibehenyl itaconate of the formula, $C_{22}H_{45}OCOCH_2C(=CH_2)COOC_{22}H_{45}$, obtained by a reaction between behenyl alcohol and itaconic acid, and 875 g (1.0 mole) of the organopolysiloxane having mercapto groups at both terminals represented by the following formula were reacted in the presence of 1 g of triphenylphosphine as a catalyst at 130° C. for 5 hours. 2440 g, corresponding to a yield of 97%, of Silicone wax (H) was obtained by stripping the solvent.

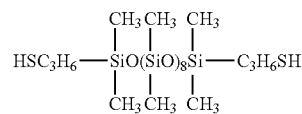

Comparative Example 5

The procedures in Comparative Example 1 were repeated except that 924 g (2.2 moles) of α-olefin having an average structural formula of $C_{30}H_{60}$, Dialen 30, ex Mitsubishi Chemical Co., was used in place of 1707 g (2.2 moles) of glycerin monoallyl ether dibehenate, to obtain 1570 g, corresponding to a yield of 95%, of Silicone wax (J).

The following Table 1 shows the apex temperature and the half width of an endothermic peak of each wax thus obtained. In the table, DSC endothermic peak temperature was measured with a DSC instrument. About 10 mg of a sample was put in an aluminum pan and heated in air from −100° C. to 150° C. at a temperature elevation rate of 10° C./min with an empty aluminum pan as a reference. A temperature at an apex of the peak was determined. A half width was determined by drawing a line parallel to the abscissa at a half-height of the peak and reading a width between the two intersection points of the DSC curve with the line.

TABLE 1

| Silicone wax | DSC endothermic peak temperature | Half width of the endothermic peak |
|---|---|---|
| (A) | 75° C. | 5° C. |
| (B) | 78° C. | 7° C. |
| (C) | 73° C. | 6° C. |
| (D) | 73° C. | 6° C. |
| (E) | 54° C. | 6° C. |
| (F) | 45° C. | 4° C. |
| (G) | 74° C. | 3° C. |
| (H) | 57° C. | 6° C. |
| (J) | 61° C. | 15° C. |

INDUSTRIAL APPLICABILITY

As shown in Table 1, the silicone wax of the present invention has a melting point of 60° C. or higher with a range of the melting point being 7° C. or smaller. The wax is suitable as a wax to be internally added to a toner.

The invention claimed is:

1. A silicone wax represented by the following formula (1),

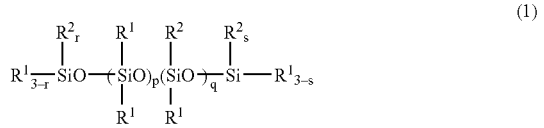

(1)

wherein $R^1$ is a group selected from the group consisting of alkyl groups having 1 to 20 carbon atoms, alicyclic groups, aryl groups, aralkyl groups and fluorinated alkyl groups;

$R^2$ is a group having a pentaerythritol polybehenate residue represented by the following formula (2),

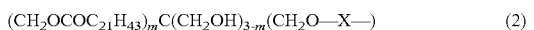

(2)

wherein $1 \leq m < 4$ or a group having a dipentaerythritol polybehenate residue represented by the following formula (3),

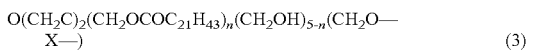

(3)

wherein $1 \leq n < 6$,

—X— in the formulae (2) and (3) being any one of the following moieties,

—$R^3$—,
—$COR^4$—, wherein $R^3$ is a $C_3$-$C_8$ alkylene group or a cycloalkylene group, $R^4$ is a $C_4$-$C_{20}$ aliphatic or alicyclic group having at least one group selected from the group consisting of carboxyl, carbonyloxy and hydroxyl groups, p, q, r and s each is a number with $0 \leq p \leq 200$, $0 \leq q \leq 200$, $0 \leq r \leq 3$, and $0 \leq s \leq 3$, provided that $0 \leq p+q \leq 200$ and $1 \leq q+r+s$.

2. The silicone wax according to claim 1, wherein $R^4$ is any one of the following moieties,

—CH($CH_2$COOH)—$R^5$—,
—$R^6$COO$CH_2$CH(OH)$R^7$— wherein $R^5$ is a $C_3$-$C_8$ alkylene or cycloalkylene group, $R^6$ is a $C_3$-$C_8$ alkylene group, and $R^7$ is a $C_3$-$C_8$ alkylene or cycloalkylene group which may have a substituent having an oxygen atom.

3. The silicone wax according to claim 1, wherein the silicone wax shows an endothermic peak when measured with a differential scanning calorimeter in a heating rate of 10° C./min, which peak has an apex at a temperature ranging from 60° C. to 100°C. and a half width of 10° C. or smaller.

4. The silicone wax according to claim 1, wherein the silicone wax has a weight average molecular weight, reduced to polystyrene, of from 2,000 to 8,000.

5. A method of preparing a silicone wax comprising the steps of (1) preparing a (di)pentaerythritol polybehenate by reacting (di)pentaerythritol with behenic acid, and (2) reacting the (di)pentaerythritol polybehenate with an organopolysiloxane modified with an acid anhydride.

6. A method of preparing a silicone wax comprising the steps of (1) preparing a (di)pentaerythritol polybehenate allyl ether by reacting (di)pentaerythritol, allyl chloride and behenic acid, and (2) reacting the (di)pentaerythritol polybehenate allyl ether with an organohydrogenpolysiloxane in the presence of a catalyst.

7. A method of preparing a silicone wax comprising the steps of (1) preparing a (di)pentaerythritol polybehenate by reacting (di)pentaerythritol with behenic acid, (2) preparing a (di)pentaerythritol polybehenate having a carboxyl group by reacting the (di)pentaerythritol polybehenate with an acid anhydride, (3) preparing an alkenylated (di)pentaerythritol polybehenate by reacting the (di)pentaerythritol polybehenate having a carboxyl group with an epoxy compound having a double bond, and (4) reacting the alkenylated (di)pentaerythritol polybehenate with an organohydrogenpolysiloxane in the presence of a catalyst.

8. The method according to any one of claims 5 to 7, wherein the behenic acid has a purity of 90% or higher.

9. The method according to claim 5 or 7, wherein the pentaerythritol polybehenate has an OH value of from 45 to 65.

10. The method according to claim 5 or 7, wherein the dipentaerythritol polybehenate has an OH value of from 20 to 40.

* * * * *